UNITED STATES PATENT OFFICE.

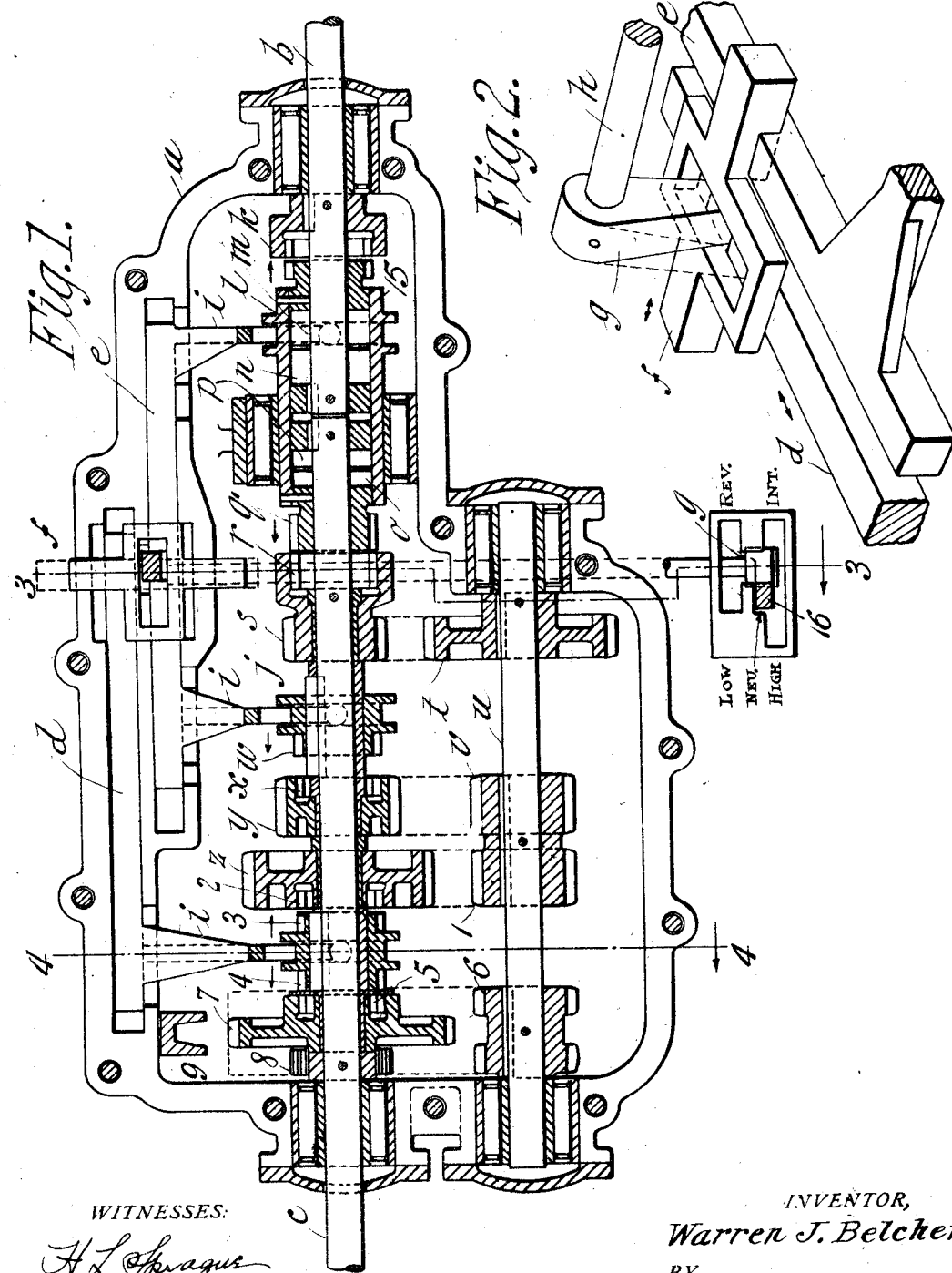

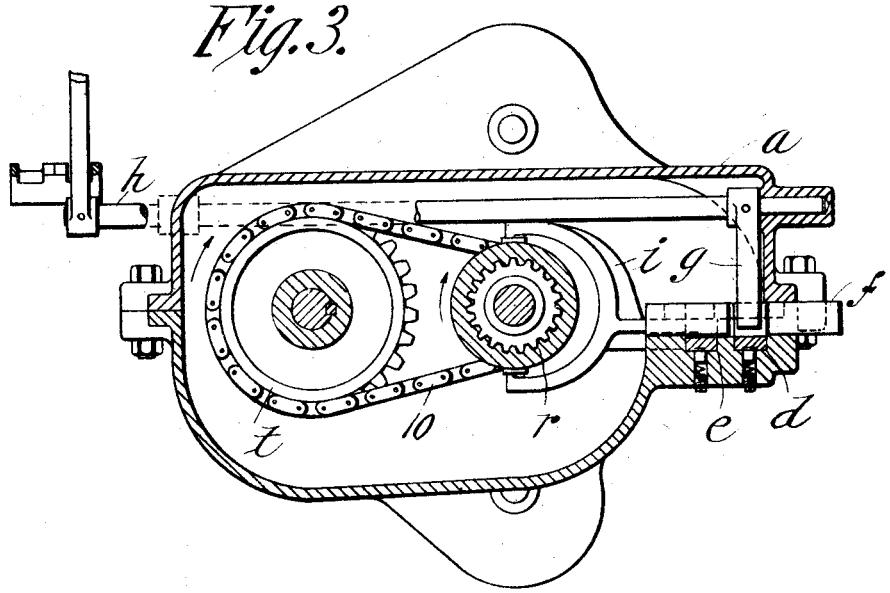
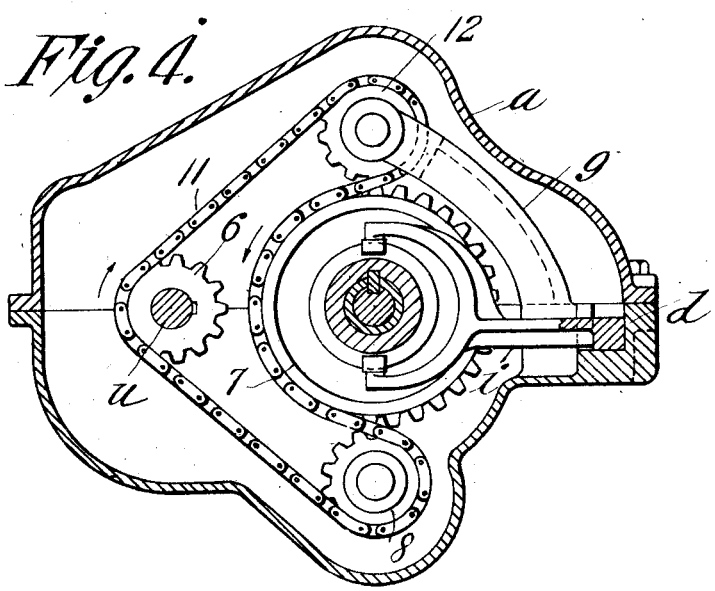

WARREN J. BELCHER, OF HARTFORD, CONNECTICUT.

CHAIN TRANSMISSION MECHANISM FOR AUTOMOBILES.

1,113,296.   Specification of Letters Patent.   Patented Oct. 13, 1914.

Application filed December 11, 1911. Serial No. 665,141.

*To all whom it may concern:*

Be it known that I, WARREN J. BELCHER, a citizen of the United States of America, residing at Hartford, in the county of Hartford and State of Connecticut, have invented new and useful Improvements in Chain Transmission Mechanism for Automobiles, of which the following is a specification.

This invention relates to an automobile transmission system and is specifically applied to a chain transmission mechanism which will avoid the use of all intermeshing gears in the transmission box.

A chain transmission mechanism is particularly useful in automobile practice because it eliminates noise, has greater durability, the cost of up-keep is lower, and the chain, by forming the weak link in the transmission mechanism, will protect the more expensive parts of the transmission mechanism against breakage.

The object of this invention is to provide a chain transmission system in which the counter-shaft will remain idle when the direct driving mechanism is in use.

It is also an object of this invention to provide a chain reverse system of efficient construction.

Other objects of the invention will appear in the detailed description and annexed claims since, broadly, the object of the invention is to generally improve an automobile transmission system.

In the drawings forming part of this application—Figure 1 is a view of the assembled transmission system supported in its casing, the upper part of which is removed, the several gears and clutches being shown in cross section to better illustrate their construction. Fig. 2 is a perspective view of the means for moving and locking the shifting bars which operate the several clutches. Fig. 3 is a cross sectional view of the assembled transmission system taken on the line 3—3 of Fig. 1. Fig. 4 is a cross sectional view of the same taken on the line 4—4 of Fig. 1, and showing the specific means of obtaining the reverse drive.

Referring to the drawings in detail, the engine shaft $b$, counter-shaft $u$, and drive-shaft $c$ are supported in the casing $a$ by suitable roller bearings. A bearing is also provided in the casing $a$ to support the shafts $b$ and $c$, where they are brought end to end. The engine drives the shaft $b$ which has pinned thereon the clutch member $k$.

A special form of clutch construction is contained in the member $l$ which, in its operation, shifts certain clutch members into and out of engagement, as may be readily traced from the drawing, as follows: If it is desired to have the engine drive direct, the clutch member $l$ is moved to the right by the operating bar $e$ and connecting-bar $i$ (Fig. 1); the clutch member $k$ is then entered by the clutch member $l$ which is driven then by $k$. The clutch members $n$ and $m$ are separated since $n$ is fast to the engine shaft $b$ and $m$ to the clutch member $l$. The clutch members $o$ and $p$ are engaged since $o$ is pinned to $l$ and $p$ is pinned to $c$.

The direct drive from the engine shaft $b$ is as follows:—through $k$ to the clutch member $l$ which drives, through the pins shown, the clutch member $o$. Since the clutch member $p$, now in engagement with $o$, is pinned to the drive-shaft $c$, the latter is driven directly by the engine shaft $b$. In this direct drive, it should be noticed that the clutch members $r$ and $q$, which when in engagement, drive the counter-shaft $u$ through the gears $s$ and $t$ and the connecting chain, are separated and the counter-shaft is therefore idle. In the direct drive, as traced out, since it is necessary to move the clutch member $l$ to the right, the clutch member $q$ is drawn away from the member $r$, and it is impossible to drive the counter-shaft $u$ and at the same time drive direct. By allowing the counter-shaft to remain idle while the direct driving mechanism is in use, a very important result is obtained, viz.—the chains between the counter-shaft and the driving-shaft all remain idle during the greater part of running time, for the direct driving mechanism, as is well known, is most used. When it is desired to drive with the intermediate speed, the clutch member $l$ is thrown to the left by means hereinafter described, whereupon the clutch members $q$ and $r$ are put into engagement and the drive from the engine shaft is as follows: from the shaft $b$ through the clutch member $n$ to the clutch member $m$, which latter is pinned to the clutch member $l$, and to this member the clutch member $q$ is also pinned. The latter will therefore drive the clutch member $r$ (with which it is now in engagement) which is fast to the sprocket-wheel s, and this sprocket-wheel will drive its chain and the sprocket-wheel t which is pinned to the shaft u, as shown. Thus the counter-shaft u is driven from the engine shaft. Now, if the operating rod e, which moves the clutch member l to the left, is moved farther to the left, the clutch member w will, by means of the connecting-bar i, be put into engagement with the clutch member x which is mounted loosely on the driving-shaft c but which is being driven by a chain running from the sprocket-wheel v pinned on the counter-shaft u; and since the clutch member w is pinned to the driving-shaft c, the latter is driven from the countershaft through the connections described, and the intermediate speed is obtained. In a similar manner the low speed is obtained by operating the bar d, by means hereinafter described, to the right so that the clutch members 2 and 3 engage. When the reverse drive is desired, the operating member d is thrown to the left in Fig. 1, and the clutch members 4 and 5 engaged. This reverse drive is obtained in the manner illustrated in Fig. 4.

A double-faced chain 11, such as is described in my co-pending application filed November 16, 1911, under Serial No. 660,590 is wrapped around the sprocket-wheels 6, 12, 7, and 8, in the manner shown. The direction of rotation of the counter-shaft u is clockwise, and since the chain is running in the opposite direction on the opposite side of the sprocket-wheel and on the opposite face of the chain than when it is making the run on the sprocket-wheel 6, a counter clockwise movement is given to said sprocket-wheel 7 and driving-shaft c. The sprocket-wheels 8 and 12 form a convenient means for a very essential support to properly guide the chain around the sprocket-wheel 7. By using the chain described in my said co-pending application and as described therein, it is possible to have the pitch-line of the sprocket-wheels 7, 8, and 12 tangent in such a manner that the chain will run between these sprocket-wheels in a most efficient manner and in less space than any other chain.

Other forms of chain could be used besides the specific one which I desire to use, but if any other form of chain is used considerable more space in the transmission box would be necessary than is the case where this specific form is used.

Since it is very important to economize space, especially in an automobile transmission casing, a very important feature of my invention is the fact that my reversing mechanism takes up so little space.

In operating the several clutch members as described, I make use of the following arrangement which will give a convenient means of throwing the clutches and at the same time positively prevent more than one clutch being operated at the same time. This means is best shown in Figs. 1 and 2. In Fig. 1 a modified form of selective mechanism is used. This mechanism which is similar to that well-known and heretofore used in this art, comprises a pair of sliding clutch operating bars, having keyways therein, a slotted cruciform plate and a lever operating with the plate, all as clearly shown and described hereinbelow. The hand operated lever is shown at 16 and it rocks a rod h having an operating lever g for engaging and moving the rods d and e. The operator of the car, starting with the lever 16 in the position shown, has his machine at rest. When it is desired to go into low speed the lever 16 is operated as follows: It is pulled from the position shown in Fig. 1 first over to the right in order that the lever g may move the slot in the bar e into exact registering position with the slot in the bar d. When the slots in the two bars d and e are in this position, then and only then can the lever g be moved over to operate the bar d and its associated clutches. This is true because the locking member f having the yoke portion, as shown in Fig. 2, has its end portions snugly sliding in a guide of the casing a. Whenever the operator desires to move the lever g from the operating slot of one bar to the slot in the other bar to operate the latter, as from the bar e to the bar d when low speed is desired, it is necessary to have the slots in the exact registering position, for otherwise the end portion of the interlocking device can not slide through the bars and allow the lever g to pass from one operating slot to the other. When the slot in the bar e is moved to the left for registering, the counter-shaft u is driven by the engine-shaft b through the connections already described. The construction just described will be clear from an examination of Figs. 1 and 2. After the lever g is placed in the operating slot of the bar d, the bar e is positively prevented from any movement by the end portion of the interlocking device f. The lever 16 can now be operated to the position marked "Low" which will move the lever g and, through the bar d, put the clutch members 3 and 2 into engagement which, as already described, will give the drive-shaft c its low speed. All the other speeds and the reverse can be obtained by operating the hand-lever 16 to the proper position marked on the selective mechanism in Fig. 1 in a similar manner to the operation described. All the movements and connections may be readily traced out by an examination of Fig. 1.

The form of clutch preferably used in this transmission mechanism is as illustrated. In this form a set of dogs on one clutch member, in an arrangement similar to the teeth of an internal gear, is adapted to be engaged by a set of dogs on the other clutch member in an arrangement similar to a spur gear, the ends of these dogs being rounded to a point to allow quick and positive engagement of the two sets of teeth.

All the chains used in the transmission mechanism are of the silent type for the reason that one of the principal things desired in this transmission mechanism is silence. There are other advantages of the chain transmission mechanism for automobiles besides the lack of noise. The chain transmission mechanism has an efficiency of approximately 96 per cent., it has longer life than an intermeshing gear transmission mechanism, in case of accident the chain transmission mechanism can be repaired or renewed at a much lower cost than the intermeshing gear type, for the parts are all easier to make. If one chain breaks, the other chains can still be used for the chain will fall to the bottom of the box and its weight will prevent it from moving to interfere with the operation of the other chains. If an intermeshing gear is stripped the small parts will work between the other gears and spoil those gears. This is a distinct advantage of the chain transmission mechanism over the other type. The load in the chain transmission mechanism is transmitted and received by approximately half of the sprocket-wheels, but in the intermeshing gear transmission mechanism the load is carried by a few teeth.

While applicant's device has been described rather specifically in order to show an operative device, it is to be understood that he claims as his invention, broadly, all the combinations as set forth in the following claims without regard to the specific form in which said combinations may be used.

What I claim, is:—

1. An automobile transmission mechanism comprising an engine shaft, a driving shaft, a counter-shaft, chain connections between said counter-shaft and said driving-shaft, a chain connection between said engine shaft and said counter shaft having a clutch member coöperating with said engine shaft, and said driving-shaft, operable when in one position to directly connect said engine shaft with said driving-shaft and disconnect the engine shaft from the counter-shaft and operable when in another position to connect the engine shaft with the counter-shaft and break the direct connection of the engine shaft with the driving-shaft.

2. An automobile transmission mechanism comprising an engine shaft, a driving shaft, a counter-shaft, a silent chain connection between said engine shaft and said counter-shaft, silent chain connections between said counter-shaft and said driving-shaft having clutch members for rendering said chain connections operable or inoperable, as desired, one of said last named chain connections arranged to drive from the counter-shaft to the driving-shaft in reversed direction, said reversing chain connection having sprocket-wheels arranged to carry a double-faced chain.

3. An automobile transmission mechanism comprising an engine shaft, a driving shaft, a counter-shaft, a chain connection between said engine and counter-shaft, chain connections between said counter-shaft and the driving-shaft having clutch members arranged to control said chain connections, and means for operating said clutch members to render said first chain connection operative before any one of the other chains can be operated.

4. An automatic chain transmission mechanism comprising an engine shaft, a counter-shaft, a driving shaft, means for connecting and disconnecting the engine shaft and counter shaft, gears mounted on said counter-shaft and driving shaft over which silent chains are adapted to run, silent chains to connect said gears, the gears on one shaft being fixed thereto, the gears on the other shaft being loose thereon, clutch members arranged to connect the loosely mounted gears to the shaft, as desired, so that a driving connection may be established from the counter-shaft to the driving shaft, one of said chain gear connections being a chain reverse mechanism to give the driving-shaft an opposite rotation to the counter-shaft.

5. An automobile chain transmission mechanism comprising an engine shaft, a counter-shaft, a driving-shaft, a chain driving mechanism from the engine shaft to the counter-shaft, one chain driving mechanism from the counter-shaft to the driving-shaft for each speed forward desired, a chain driving mechanism from the counter-shaft to the driving shaft for the reverse comprising a gear on the counter-shaft, a gear on the driving-shaft, two idler gears one above and the other below one of said gears, and a double-faced chain arranged for the teeth on one face to engage the teeth of one of said gears and both idler gears and the teeth on the other face to engage only the teeth on the other gears.

6. An automobile chain transmission mechanism comprising an engine shaft, a counter-shaft, a driving shaft, a chain driving mechanism from the engine shaft to the counter-shaft, one chain driving mechanism from the counter-shaft to the driving-shaft for each speed forward desired, a chain driving mechanism from the counter-shaft to the driving-shaft for the reverse comprising a gear on the counter-shaft, a gear on the driving-shaft, two idler gears one directly above and the other directly below the gear on the driving-shaft, the three last mentioned gears arranged to have a common center line and the two idler gears having their pitch lines tangent with the pitch line of the gear on the driving-shaft, and a double-faced chain arranged to run from the gear on the counter-shaft around one idler around the gear on the driving-shaft to reverse the direction of that gear around the other idler, and back to the counter-shaft gear.

7. A mechanism of the class described comprising an engine-shaft, a driving-shaft and a counter-shaft operatively located relative to said driving-shaft, means for connecting and disconnecting the engine shaft and counter shaft, positive flexible driving connections between said counter and driving shafts to rotate the latter in either direction, together with a clutch mechanism operable to effect the rotation of said driving shaft in either direction, as described.

8. A mechanism of the class described comprising an engine-shaft, a driving-shaft in axial alinement therewith, a counter-shaft, positive flexible driving connections between said counter and said other shafts to rotate the driving-shaft in either direction, together with a clutch mechanism operable to effect the rotation of said driving-shaft in either direction, as described.

9. A chain transmission mechanism comprising engine, driving, and counter shafts, chain driving mechanism connecting said driving and engine shafts and said counter-shaft having clutch members arranged to effect the rotation of said driving shaft in either direction, as described.

10. An automobile transmission mechanism, comprising, an engine shaft, a driving shaft, a counter shaft, driving connections between said counter shaft and said driving shaft, a driving connection between said engine shaft and said counter shaft, having a clutch member coöperating with said engine shaft and said driving shaft operable when in one position to directly connect said engine shaft with said driving shaft and disconnect the engine shaft from the counter shaft and operable when in another position to connect the engine shaft with the counter shaft and break the direct connection of the engine shaft with the driving shaft.

WARREN J. BELCHER

Witnesses:
 FRANKLIN G. NEAL,
 C. E. WHITNEY.